United States Patent [19]

Sigworth, Jr.

[11] 4,312,687
[45] Jan. 26, 1982

[54] SOLAR COLLECTOR HEADERS

[75] Inventor: Harry W. Sigworth, Jr., Orinda, Calif.

[73] Assignee: Chevron Research Company, San Francisco, Calif.

[21] Appl. No.: 216,576

[22] Filed: Dec. 15, 1980

[51] Int. Cl.³ .................. B29D 23/02; B29D 3/00
[52] U.S. Cl. .................. 156/245; 156/294;
249/83; 249/91; 249/94; 249/95; 249/97;
249/122; 264/219; 264/221; 264/261; 264/262;
264/263; 264/275; 264/277; 264/278; 264/279;
264/317; 264/318; 264/328.1; 264/328.2;
264/334
[58] Field of Search ............... 264/219, 259, 261, 263,
264/271, 277, 279, 328.1, 328.2, 334, 318, 221,
265, 275, 317, 278; 285/21, 150, 155, 156, 189,
288, 284, 423, DIG. 20, DIG. 24; 249/83, 94,
90, 95, 97, 122; 156/245, 242, 294; 126/448;
165/172, 173, 175, 176

[56] References Cited

U.S. PATENT DOCUMENTS

| 96,555 | 11/1869 | Dayton | 285/189 |
|---|---|---|---|
| 1,823,028 | 9/1931 | Caldwell | 285/189 |
| 1,897,320 | 2/1933 | McKnight et al. | 285/189 |
| 1,908,821 | 5/1933 | Cornell | 285/155 |
| 2,079,393 | 5/1937 | Benge | 285/156 |
| 3,092,441 | 6/1961 | Bilderbeek | 285/156 |
| 3,458,619 | 7/1969 | Prochaska | 264/263 |
| 4,112,921 | 9/1978 | MacCracken | 126/271 |
| 4,176,654 | 12/1979 | Zinn et al. | 126/448 |

FOREIGN PATENT DOCUMENTS

| 1344048 | 10/1963 | France | 264/328.1 |
|---|---|---|---|
| 226734 | 6/1969 | Sweden | 285/155 |
| 427633 | 4/1935 | United Kingdom | 285/155 |

OTHER PUBLICATIONS

Sola Roll (Commercial Literature) Tube Plate Assembly (1 p.).
Sola Roll—Solar & Radiant Heating Systems (7 p.).
Kirk Othmer—Encyl. of Che. Tech.-2nd Ed., vol. 15, pp. 804-805.
Kirk Othmer—vol. 17, pp. 545, 575, 576.

Primary Examiner—Willard E. Hoag
Attorney, Agent, or Firm—R. H. Evans; Edward J. Keeling

[57] ABSTRACT

The present invention presents a novel method for injection molding a header to the open-ended tubes of an elastomeric solar collector. Special mold pieces and mandrels are required to carry out the invention.

7 Claims, 4 Drawing Figures

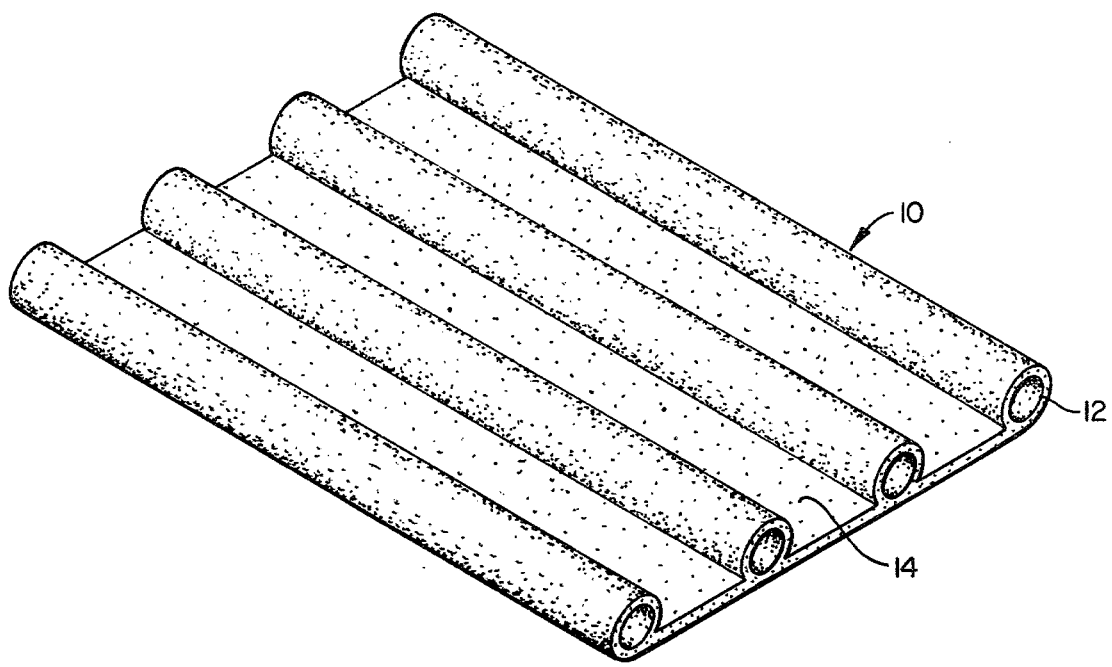
FIG.__1.
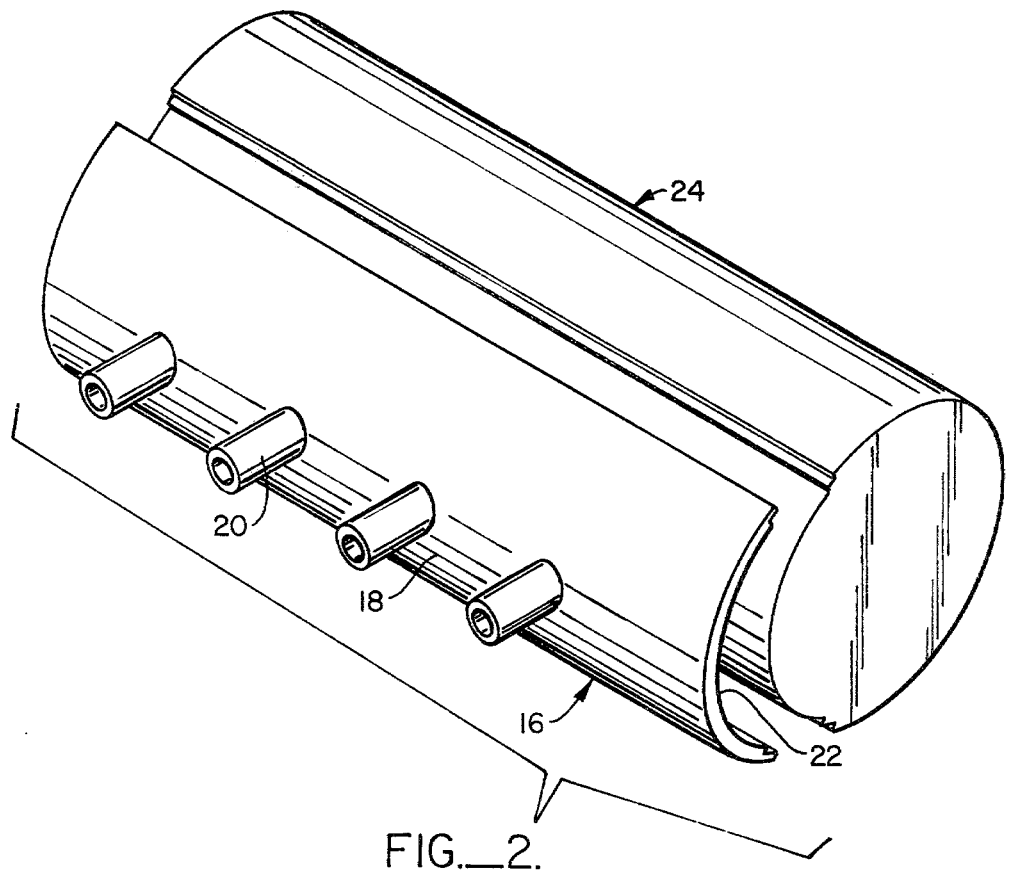
FIG.__2.

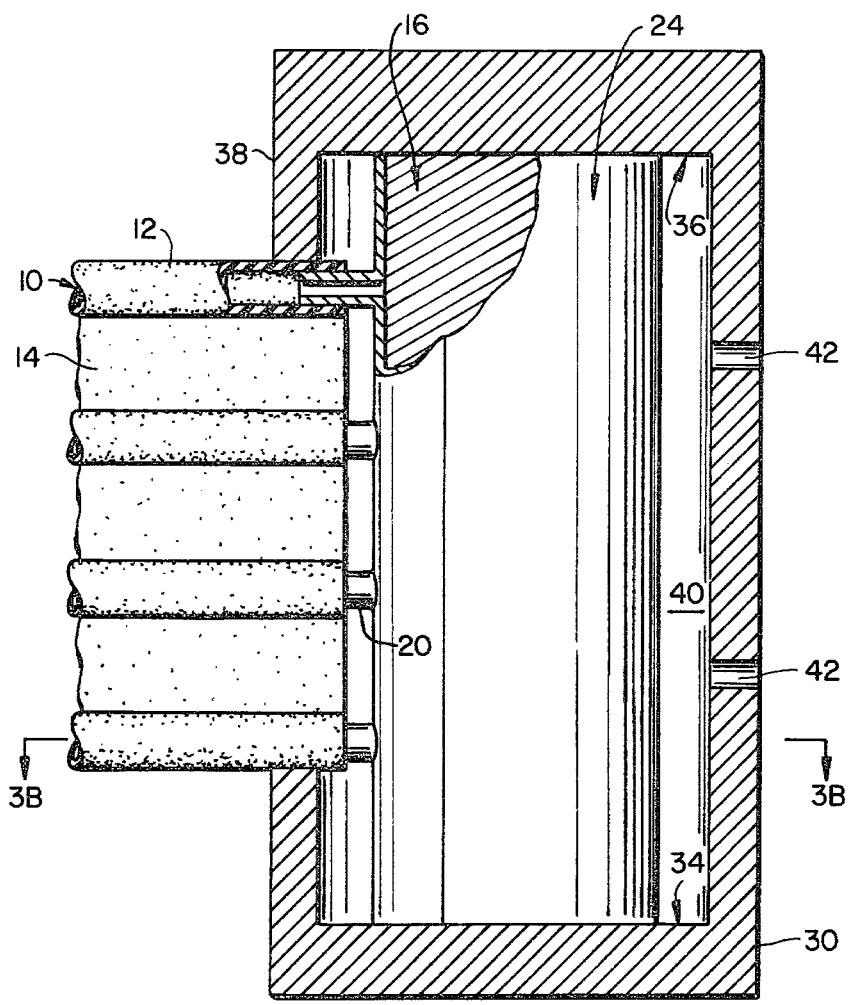
FIG._3A.
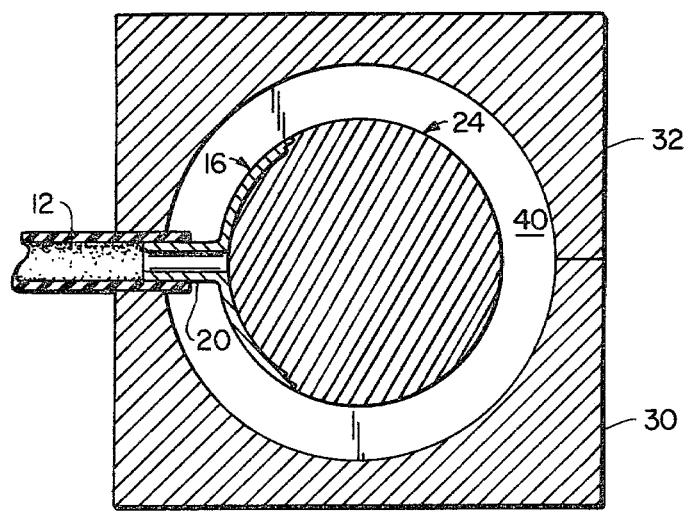
FIG._3B.

SOLAR COLLECTOR HEADERS

FIELD OF THE INVENTION

This invention relates to a method for bonding headers to a plurality of pliable open-ended tubes. More particularly, the invention relates to an economic process for the injection or compression molding of headers to commercially available lengths of extruded elastomeric solar collectors.

PRIOR ART

With the dwindling supplies of fossil fuels, extensive research efforts have been directed toward the economical harnessing of solar energy. While there is no doubt that technologically feasible solar energy systems can be, and have been, developed, the costs of implementing such systems are often unjustified when compared to conventional energy systems.

In those systems which employ collectors having a fluid flowing therethrough for energy transport, major cost considerations include the materials of construction and fabrication expense for a reliable unit that will withstand the severe operating conditions encountered over the lifetime of the collector. It is preferable that the collectors be designed to endure freezing temperatures and simultaneously allow for expansion if the fluid freezes. The collectors should also be able to withstand temperatures at least as high as 170° C. and not be unduly susceptible to degradation as a result of exposure to sunlight.

A preferred material of construction used in the industry for fabrication of freeze tolerant collector tubing is the low gravity synthetic rubber, commonly called EPDM. EPDM is an acronym for ethylene-propylene-diene-monomer and is formulated under various trade names by a number of manufacturers. The unsaturation in the polymer is pendent to the saturated polymer chain and permits sulfur and other forms of vulcanization.

Properly formulated and cured EPDM product is extremely resistant to degradation by sunlight, is pliable and may be used beyond the temperature ranges set forth above. Perhaps, more importantly, it is quite inexpensive and may be readily extruded to form economical sheets of collector tubing.

Several manufacturers fabricate collectors from EPDM which comprise hollow cylindrical tubing, alternating with ribbing. While sheets of this nature may be readily extruded in commercial production, the attachment of headers to the tubing for the introduction and removal of the transport liquid, presents problems.

One manufacturer recommends the attachment of headers to EPDM tubing by inserting jamb sleeves into the end of each tube and thumb-pressing the tube ends into radially aligned holes formed in a cylindrical header. Such a procedure, however, is labor-intensive and time consuming. Furthermore, such connections are often made at the construction site by persons having little or no experience in the field. It is therefore an object of the present invention to provide an alternative method of bonding headers to extruded elastomeric collector tubing which overcomes the deficiency of the prior art.

SUMMARY OF THE INVENTION

The present invention relates to a method for forming a header to receive a plurality of open-ended hollow pliant tubes such as those extruded for solar energy collectors. The end of each tube is fitted around mating substantially radially aligned hollow cylindrical elements, which project perpendicularly through the convex side of a transversely cut cylindrical section. A mating transversely cut cylindrical mandrel is placed in an abutting relationship with the transversely cut cylindrical section to form a cylinder having projecting elements in open communication therewith. The transversely cut cylindrical section and the mandrel are then used as a male plug for an injection or compression mold. After the elastomer has cured in the mold, the mandrel is be removed from one end of the header and the transversely cut cylindrical section having the projecting hollow elements may be left therein to provide additional support between the header proper and the bonded joints or removed if desired.

BRIEF DESCRIPTION OF THE DRAWINGS

FIG. 1 is an isometric view of a section of a commercial extruded collector.

FIG. 2 is an isometric view of a male plug used in the present invention.

FIG. 3A is a top view of an injection mold as used in the present invention.

FIG. 3B is a cross-sectional view taken along lines 3B of FIG. 3A.

DETAILED DESCRIPTION OF THE PREFERRED EMBODIMENTS

Referring to the drawings and to FIG. 1 in particular, there is shown an elastomeric collector generally referred to by reference numeral 10. The collector is comprised with plurality of pliant hollow tubes 12 extending the length thereof. Separating each tube is an elastomeric web 14 or fin which serves to increase the area of the collector exposed to the solar radiation and which maintains the individual tubes in a spaced relationship.

Shown in FIG. 2 of the drawings is a mold-piece 16 which is constructed of a transverse hollow cylindrical section 18 having a plurality of projecting cylindrical elements 20 extending therefrom. The projecting elements 20 are substantially in radial alignment along the length of cylindrical section 18, and have an outer diameter substantially equal to the inner diameter of tube 12 in FIG. 1. Elements 20 are hollow and in open communication with the concave side 22 of section 18. Preferably, cylindrical section 18 will subtend an arc of 180° or less, but in any event, will be sufficiently large to support the projecting elements. Also shown in FIG. 2 is a mandrel 24 which is comprised of a transversely cut mating cylindrical section.

Preferably mold piece 16 is constructed of copper. The mandrel may be constructed of steel or any other material which is suitably treated to resist adhesion to the injected molding compound.

In accordance with the present invention, the projecting elements 20 are first inserted into the ends of tubing 12. Clamps or jigs may be used to advantage for aligning and holding the end of the collector tubing stationary while elements 20 are inserted in the tubing. Mold piece 16 and mandrel 24 are then placed in abutment in an injection or compression mold as shown in FIGS. 3A and 3B. (Identical reference numbers are used in all figures for corresponding elements to ease in understanding the invention.) A lower mold housing 30 only is shown in FIG. 3A, whereas an upper mold housing 32 and lower mold housing 30 are shown in FIG. 3B.

As shown in FIG. 3A the ends of the mold piece 16 and mandrel 24, sealingly abut the innerfaces 34 and 36 of the mold housing. Such an arrangement will necessarily result in a molded header having two open ends.

In a preferred embodiment of this invention one end of the male plug is offset from the inner mold wall face. Such an arrangement will result in a header having a single open end.

Sidewall 38 of the mold has a plurality of half cylindrical notches therein for receipt of the collector tubing encasing projecting elements 20. After the top mold housing 32 is placed securely over mold housing 30, an elastomeric substance such as EPDM is conventionally injected (or introduced prior to closure and heating for compression molding) in mold cavity 40 through apertures 42. Mold housings 30 and 32 ar separated after the elastomer is cured. Mandrel 24 may then be removed from either open end of the newly formed header. However, it is preferred that mold piece 16 be permanently left in the header to provide extra stiffness and strength at the bonded joint between the header and the ends of tubing 12.

In another embodiment of the present invention the mold piece 16 is also removed after the removal of mandrel 24. For this embodiment, the projecting elements 20 need not be hollow.

When mold piece 16 is left permanently in the header, an appropriate adhesive may advantageously be used to bond the projecting elements 20 of mold piece 16 to the interior of tubes 12. Since the purpose of the adhesive is to prevent the heat transport liquid in the operating collector from seeping between the mold piece and the elastomeric tubing, and thereby possibly impairing the tubing-header bond, the adhesive must be resistant to the transport liquid.

It is also preferred that the header be bonded to the collector tubing prior to the final curing or vulcanization of the tubing. Thus the header could be molded to partially cured tubing before the final heat treatment or vulcanization.

What is claimed is:

1. A method for forming a hollow elongated header having plural radially disposed hollow pliant tubes, comprising:
   fitting an end of each of said tubes around a mating one of plural hollow cylindrical elements projecting radially from the canvex side of a hollow, semi-cylindrical member; placing said member in abuttment with a generally cylindrical mandrel to form a generally cylindrical assembly having plural radially projecting elements; disposing said assembly in a female mold with said tubes projecting through apertures in a wall of said mold; injection molding a hardenable elastomeric material in a cavity space between said female mold and said assembly;
   hardening said material about said assembly including ends of said tubes and removing said mandrel to form said header.

2. A method as recited in claim 1, further comprising:
   removing said mandrel from one end of said elastomeric header.

3. A method as recited in claim 2, further comprising removing said semi-cylindrical member having the projecting cylindrical elements.

4. A method as recited in claim 2 or 3 further comprising:
   bonding the exterior surfaces of the hollow projecting cylindrical elements to the interior surface of the tube ends prior to the molding step.

5. A method as recited in claim 1, 2 or 3 wherein said open-ended pliant tubes are only partially cured prior to the molding step.

6. A method for forming a header to receive a plurality of open-ended hollow partially cured pliant tubes, which comprises:
   fitting the end of each tube around mating, substantially radially aligned, cylindrical elements projecting perpendicularly from the convex side of a hollow copper semi-cylindrical member, placing said member in abutment with a generally cylindrical mandrel to form a generally cylindrical assembly having plural radially projecting elements;
   disposing said assembly in a female mold with said tubes projecting therefrom;
   injection molding a hardenable elastmeric material in a cavity space between and defined by said female mold and said assembly;
   hardening said material about said assembly including ends of said tubes and removing said mandrel.

7. A method as recited in claim 6, further comprising:
   removing said semi-cylindrical member having the projecting elements from said header through the open end thereof.

* * * * *